(12) United States Patent
Stanger et al.

(10) Patent No.: US 7,376,159 B1
(45) Date of Patent: May 20, 2008

(54) EXPLOITATION OF NULL PACKETS IN PACKETIZED DIGITAL TELEVISION SYSTEMS

(75) Inventors: Leon J. Stanger, Farmington, UT (US);
Hanno Basse, Santa Monica, CA (US);
James A. Michener, Grass Valley, CA (US);
Robert H. Plummer, Seattle, WA (US);
Richard K. Newman, North Hollywood, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 891 days.

(21) Appl. No.: 10/038,174

(22) Filed: Jan. 3, 2002

(51) Int. Cl.
*H04J 3/00* (2006.01)

(52) U.S. Cl. ..................... 370/528; 370/537

(58) Field of Classification Search ............... 370/537, 370/538, 540, 528
See application file for complete search history.

(56) References Cited

U.S. PATENT DOCUMENTS

| | | | |
|---|---|---|---|
| 3,627,914 A | 12/1971 | Davies | |
| 3,843,942 A | 10/1974 | Pierret et al. | |
| 5,337,041 A | 8/1994 | Friedman | |
| 5,363,147 A | 11/1994 | Joseph et al. | |
| 5,404,315 A | 4/1995 | Nakano et al. | |
| 5,424,770 A | 6/1995 | Schmelzer et al. | |
| 5,448,568 A * | 9/1995 | Delpuch et al. | 348/423.1 |
| 5,461,619 A * | 10/1995 | Citta et al. | 370/468 |
| 5,463,620 A | 10/1995 | Sriram | |
| 5,506,844 A * | 4/1996 | Rao | 370/468 |
| 5,532,753 A | 7/1996 | Buchner et al. | |
| 5,579,404 A | 11/1996 | Fielder et al. | |
| 5,625,743 A | 4/1997 | Fiocca | |
| 5,650,825 A * | 7/1997 | Naimpally et al. | 348/465 |
| 5,657,454 A | 8/1997 | Benbassat et al. | |
| 5,666,430 A | 9/1997 | Rzeszewski | |
| 5,729,556 A | 3/1998 | Benbassat et al. | |
| 5,751,723 A | 5/1998 | Vanden Heuvel et al. | |
| 5,778,077 A | 7/1998 | Davidson | |
| 5,802,068 A * | 9/1998 | Kudo | 370/538 |
| 5,822,018 A | 10/1998 | Farmer | |
| 5,831,681 A | 11/1998 | Takahashi et al. | |
| 5,854,658 A | 12/1998 | Uz et al. | |

(Continued)

FOREIGN PATENT DOCUMENTS

EP 1 150 446 A2 10/2001

(Continued)

OTHER PUBLICATIONS

Govindan et al., *Scheduling And IPC Mechanisms For Continuous Media*, 13th ACM Symposium On Operating Systems Principles, 1991, 13 pages.

(Continued)

*Primary Examiner*—Min Jung

(57) ABSTRACT

A system and method for adding auxiliary data $D_A$ to an output data stream from a statistical multiplexer is disclosed. An auxiliary multiplexer accepts a statistically multiplexed data stream, and substitutes auxiliary data packets for null data packets. The auxiliary multiplexer controls the number of null packets in the statistically multiplexed data stream by controlling the target bandwidth $B_T$ of the statistical multiplexer, or by modifying the statistical multiplexer equation to make the auxiliary data stream a participant in the negotiation process of allocating throughput among the data sources.

28 Claims, 10 Drawing Sheets

U.S. PATENT DOCUMENTS

| | | | |
|---|---|---|---|
| 5,864,557 | A | 1/1999 | Lyons |
| 5,877,821 | A | 3/1999 | Newlin et al. |
| 5,898,675 | A | 4/1999 | Nahumi |
| 5,912,890 | A | 6/1999 | Park |
| 5,966,120 | A * | 10/1999 | Arazi et al. ............. 715/724 |
| 5,987,031 | A | 11/1999 | Miller et al. |
| 5,991,812 | A | 11/1999 | Srinivasan |
| 6,047,178 | A | 4/2000 | Frlan |
| 6,064,676 | A | 5/2000 | Slattery et al. |
| 6,137,834 | A | 10/2000 | Wine et al. |
| 6,169,584 | B1 | 1/2001 | Glaab et al. |
| 6,169,807 | B1 | 1/2001 | Sansur |
| 6,169,973 | B1 | 1/2001 | Tsutsui et al. |
| 6,188,439 | B1 | 2/2001 | Kim |
| 6,195,438 | B1 | 2/2001 | Yumoto et al. |
| 6,208,666 | B1 | 3/2001 | Lawrence et al. |
| 6,252,848 | B1 | 6/2001 | Skirmont |
| 6,259,695 | B1 | 7/2001 | Ofek |
| 6,298,089 | B1 | 10/2001 | Gazit |
| 6,369,855 | B1 | 4/2002 | Chauvel et al. |
| 6,389,019 | B1 | 5/2002 | Fan et al. |
| 6,430,233 | B1 | 8/2002 | Dillon et al. |
| 6,687,247 | B1 | 2/2004 | Wilford et al. |
| 6,765,867 | B2 | 7/2004 | Shanley et al. |
| 6,931,370 | B1 | 8/2005 | McDowell |
| 7,035,278 | B2 | 4/2006 | Bertram et al. |
| 7,130,310 | B2 * | 10/2006 | Itawaki et al. ............. 370/465 |
| 2001/0016048 | A1 | 8/2001 | Rapeli |
| 2001/0047267 | A1 | 11/2001 | Abiko et al. |
| 2002/0004718 | A1 | 1/2002 | Hasegawa et al. |
| 2002/0085584 | A1 * | 7/2002 | Itawaki et al. ............. 370/465 |
| 2002/0146023 | A1 | 10/2002 | Myers |
| 2002/0169599 | A1 | 11/2002 | Suzuki |
| 2002/0173864 | A1 | 11/2002 | Smith |
| 2004/0199933 | A1 | 10/2004 | Ficco |
| 2006/0203919 | A1 * | 9/2006 | Hamilton ............... 375/240.26 |

FOREIGN PATENT DOCUMENTS

| | | |
|---|---|---|
| GB | 2341745 | 3/2000 |
| JP | 10-284960 | 10/1998 |
| JP | 2001-111969 | 4/2001 |
| JP | 2001-169248 | 6/2001 |
| WO | WO99/53612 | 10/1999 |
| WO | WO 01/30086 | 4/2001 |

OTHER PUBLICATIONS

Bhaskaran, V. ED—Institute of Electrical and Electronics Engineers: "Mediaprocessing in the Compressed Domain" Digest of Papers of COMPCON (Computer Society Conference) 1996 Technologies for the Information Superhighway. Santa Clara, Feb. 25-28, 1996, Digest of Papers of the Computer Society Computer Conference COMPCON, Los Alamitos, IEEE Comp. Soc. Press, vol. Conf. 41, Feb. 25, 1996, pp. 204-209, XP010160896—ISBN: 0-8186-7414-8 *abstract*, *p. 208, right-hand col., paragraph 3—p. 209, left-hand col., paragraph 1*.

Brandenburg, K. et al.: ISO-MPEG-1 Audio: A Generic Standard for Coding of High-Quality Digital Audio Journal of the Audio Engineering Society, Audio Engineering Society. New York, US, vol. 42, No. 10, Oct. 1994, pp. 780-792; XP000978167—ISSN: 0004-7554 *abstract*, *p. 785, left-hand col., paragraph 2—p. 786, left-hand col., paragraph 1; figures 2,3*.

Hans, M. et al.: "An MPEG Audio Layered Transcoder"—Preprints of Papers Presented at the AES Convention, XX, XX, Sep. 1998, pp. 1-18, XP001014304—*abstract*, *p. 11, paragraph 1*.

EPO Communication dated Aug. 22, 2007.

Official communication dated Sep. 1, 2006.

Official communication dated Jan. 23, 2007.

Translation of Official Action dated Jul. 18, 2006.

Translation of Decision of Rejection dated Nov. 7, 2006.

Translation of Pre-Appeal Examination Report dated Apr. 3, 2007.

Smith, Nigel; "Satellite Data Broadcasting-An End to the World-Wide Wait?"; NDS Data Broadcasting Article; 1997 The Institute of Electrical Engineers; published by IEE, Savory Place, London, U.K.; pp. 6/1-6/11; XP 6502899.

EPO Communication dated Jan. 22, 2008 in counterpart European patent application No. 03000152.3.

U.S. Appl. No. 10/660,952, filed Sep. 12, 2003, James, Final Office Action dated Jan. 10, 2008.

U.S. Appl. No. 10/426,664, filed Apr. 30, 2003, Michener, Non-final Office Action dated Nov. 28, 2007.

* cited by examiner

EXPLOITATION OF NULL PACKETS IN PACKETIZED DIGITAL TELEVISION SYSTEMS

CROSS REFERENCE TO RELATED APPLICATIONS The present application is related to the following applications: U.S. application Ser. No. 10/426,664, filed Apr. 30, 2003 U.S. application Ser. No. 10/192,960, filed Jul. 10, 2002, now U.S. Pat. No. 7,286,473, issued Oct. 23, 2007; and U.S. application Ser. No. 10/660,952, filed Sep. 12, 2003.

BACKGROUND OF THE INVENTION

1. Field of the Invention

The present invention relates to systems and methods for multiplexing data from a plurality of data sources, and in particular to a method and system for substituting non-opportunistic auxiliary data for null data packets in a packetized data stream.

2. Description of the Related Art

Packet-based digital data transmission systems are now commonplace. One example of such systems are those which are used to transmit media programs such as television programs and audio data to subscribers via satellite. Such systems are required to transmit many (200 or more) channels of data to subscribers over a transmission system that has a fixed throughput.

By their nature, packet-based television systems must fill all packets with data, and the packets must fill the entirety of a constant bit rate (CBR) transmission data channel. Television and audio signals are "bursty" in that some pictures and some audio passages require more data to be faithfully reproduce the original signal than other pictures and passages. To account for this "bursty" nature and to assure the data from each of the channels are combined and transmitted within the throughput requirements of the transmission system, the data from each of the channels is typically provided to a statistical multiplexer. The statistical multiplexer supervises the encoders that encode and/or compress the incoming channels. This process includes negotiating and allocating throughput among each of the encoders. Statistical multiplexers are disclosed in U.S. Pat. No. 5,854,658, issued to Uz et al, U.S. Pat. No. 5,864,557, issued to Lyons, and U.S. Pat. No. 5,912,890, issued to Park, and U.S. Pat. No. 6,208,666, issued to Lawrence et al., which references are hereby incorporated by reference.

When the media program is reproduced by less data, null data packets are typically inserted into the data stream. This is performed so that the data channel is maintained at a CBR. While this technique is effective, the null packets used in this technique typically convey no useful information, and are therefore a waste of precious bandwidth. Hence, systems have been devised which insert opportunistic (non-time critical data) into the data stream before being output from the statistical multiplexer. The system disclosed in U.S. Pat. No. 5,864,557 is one such example.

However, since the number of null packets available at any given time is unpredictable, the only "opportunistic" data (data which is not time-critical) is transmitted in the place of the null data packets. Non-opportunistic data (with more stringent delivery timing requirements) cannot be transmitted using such methods. What is needed is a system and method for replacing null data packets with non-opportunistic auxiliary data. What is also needed is for the system and method that permits the insertion of null data packets without modification to the statistical multiplexer and to be operable with a wide variety of statistical multiplexer designs. The present invention satisfies that need.

SUMMARY OF THE INVENTION

In summary, the present invention describes a system and method for adding auxiliary data $D_A$ to an output data stream. The apparatus comprises a statistical multiplexer having a plurality of inputs including a first input, and an output providing the output data stream; a first encoder, having an output communicatively coupled to the a first statistical multiplexer input, the first encoder for compressing a first data stream $D_1$ according to a first actual data rate $BW_{A_1}$ that is less than or equal to a first granted data rate $BW_{G_1}$ granted by the statistical multiplexer in response to a requested data rate $BW_{R_1}$ from the encoder, the difference between the first actual data rate $BW_{A_1}$ and the first granted data rate $BW_{G_1}$ defining an encoder overhead rate $BW_{O1}$ such that $BW_{G_1} - BW_{A_1} = BW_{o_1} \geq 0$, the first encoder having an output including an compressed version of the first data stream $d_1$ provided at the actual data rate $BW_{A_1}$ and encoder null data $N_{E_1}$ at the overhead rate $BW_{O1}$; and an auxiliary multiplexer, communicatively coupled to the statistical multiplexer, for sensing encoder null data $N_E$ and for substituting at least a portion of the auxiliary data $D_A$ for the encoder null data $N_E$. The method comprises the steps of accepting a statistically multiplexed data stream having null data; and substituting at least a portion of the auxiliary data $D_A$ for the null data (null data is a global inclusive term meaning data that does not include anything useful) in the statistically multiplexed data stream.

The efficient management of the replacement of null data with useful data makes more efficient use of the bandwidth of the digital transmission system, effectively creating more payload capacity in existing transmission channels that can be used for video, audio, or other auxiliary data.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Media Program Distribution System

Figure 1:
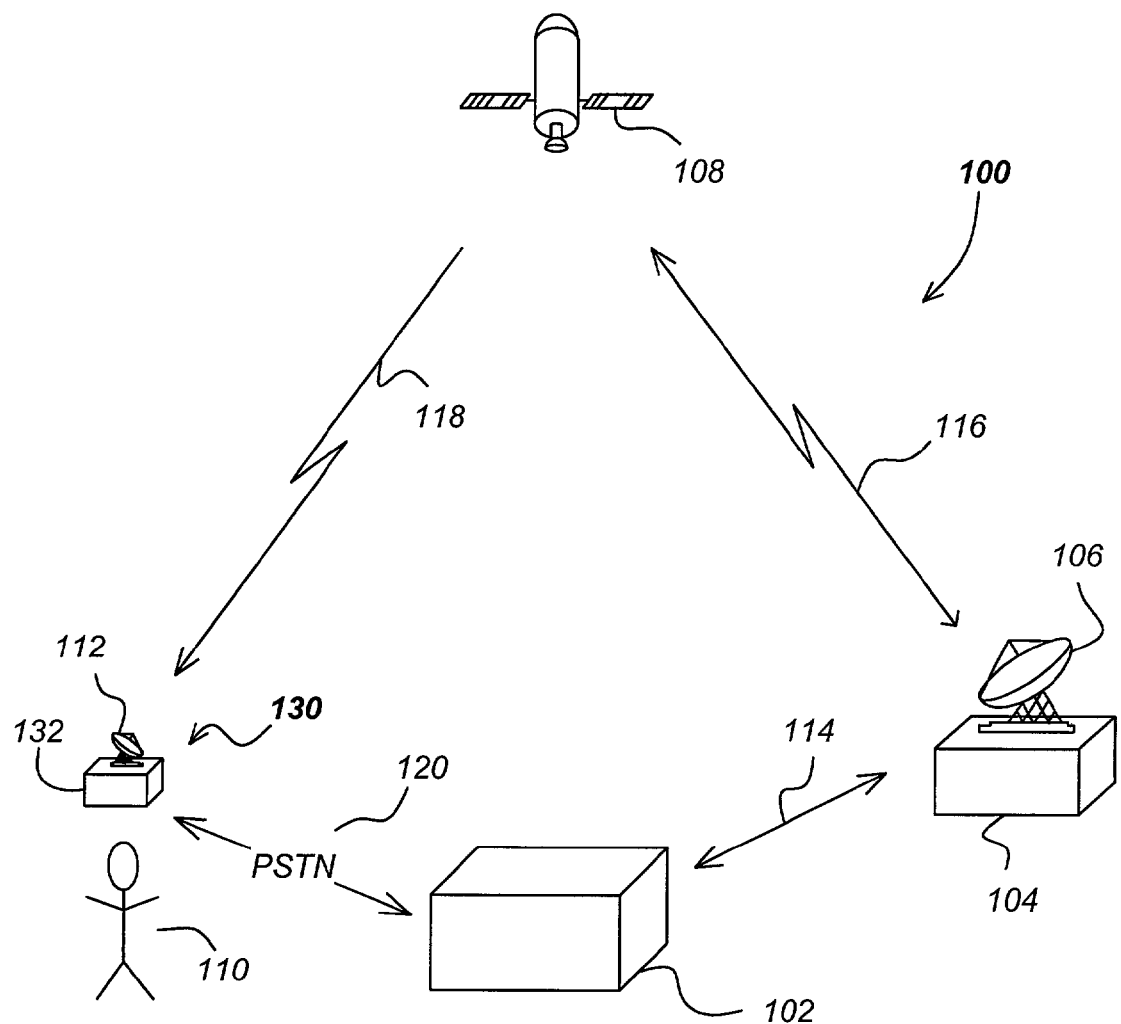
FIG. 1 is a diagram showing an overview of a media program distribution system.

FIG. 1 is a diagram illustrating an overview of a media program distribution system 100. The media programs transmitted by the distribution system 100 can include video programs, audio programs, or any other data. The distribution system 100 comprises a control center 102 in communication with an uplink center 104 via a ground or other link 114 and an integrated receiver/decoder (IRD) 132 at receiver station 130 via a public switched telephone network (PSTN) or other communication link 120. The control center 102 provides program material to the uplink center 104, coordinates with the receiver station 130 to offer subscribers 110 media programs including pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the IRD 132 at the receiver station 130 via downlink 118. The IRD 132 receives this information using the subscriber antenna 112, to which it is communicatively coupled.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information, or any other kind of data as well.

Figure 2:
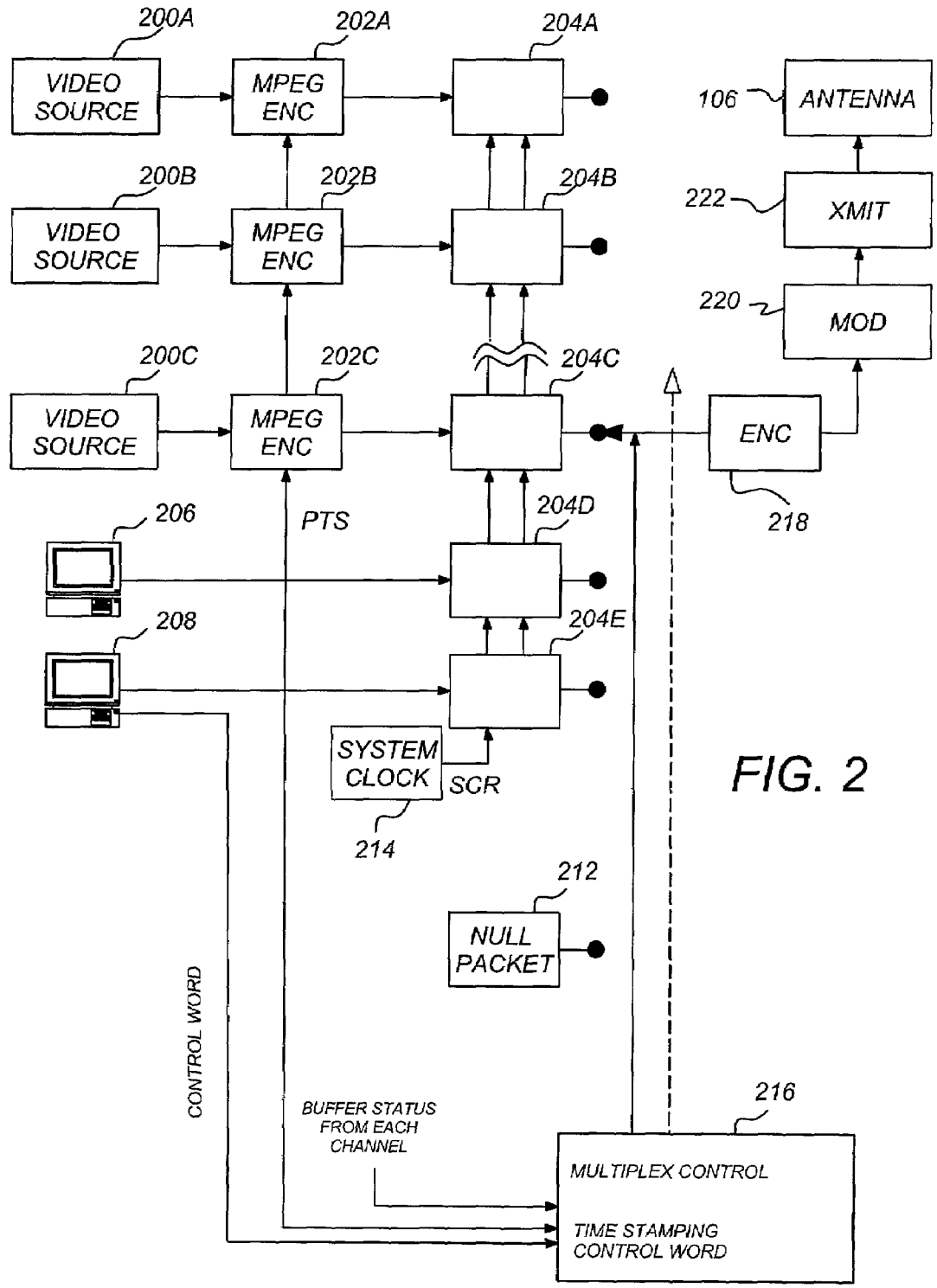
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other encoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204E (collectively referred to hereinafter as packetizer(s) 204) associated with each source 200, 206-208.

The data packets are assembled using a reference from the system clock 214 (SCR), a control word (CW) generated by the conditional access manager 208, and a identifier such as a packet identifier (PID) that associates each of the data packets that are broadcast to the subscriber with a program channel. In one embodiment, the packet identifier PID is a packet identifier consistent with the definitions described in the standards established by the MPEG, however other packet identifier conventions can also be used. For example, some satellite television systems use a packet identifier known as a system channel identifier (SCID).

This information is transmitted to the packetizers 204 for use in generating the data packets. These data packets are then multiplexed into serial data via a statistical multiplexer (described in greater detail below), encoded, modulated, and transmitted. A special packet known as a control word packet (CWP) which comprises control data including the control word (CW) and other control data used in support of providing conditional access to the program material is also encrypted and transmitted.

Figure 3A:
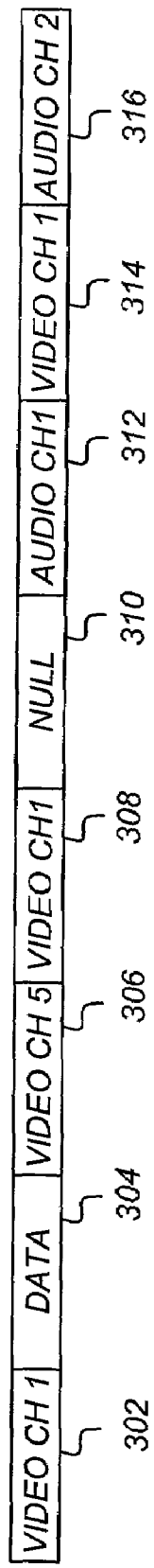
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The next data packet is a null packet 310 having null data provided by null packet generator 212. Further details regarding null packet insertion is presented below.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the PID, the IRD 132 reassembles the packets to regenerate the program material for each of the channels. As shown in FIG. 3A, null packets created by the null packet module 312 may be inserted into the data stream as desired.

Figure 3B:
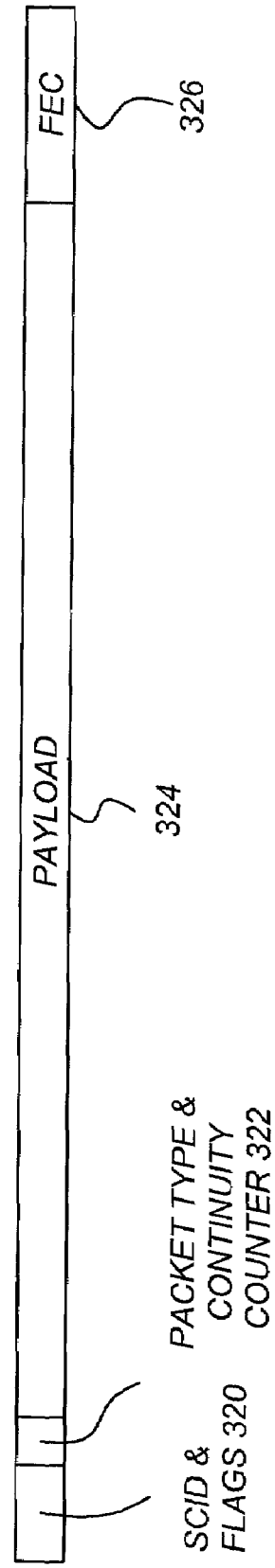
FIG. 3B is a diagram illustrating the structure of a data packet.

FIG. 3B is a diagram of a data packet. Each data packet (e.g. 302-316) is 208 bytes long, and comprises a number of packet segments. The first packet segment 320 comprises two bytes of information containing the PID and flags. In one embodiment, the PID is a unique 13-bit number that uniquely identifies the data packet's data channel. The flags include bits and are used control whether the packet is encrypted, and what key must be used to decrypt the packet. The second packet segment 322 is made up of a packet type indicator and a continuity counter. The packet type identifies the packet as one of the four data types (video, audio, data, or null). When combined with the PID, the packet type determines how the data packet will be used. The continuity counter increments once for each packet type and PID. The next packet segment 324 comprises 184 bytes of payload data, which is a portion of the video program provided by the video program source 200. The final packet segment 326 is data required to perform forward error correction.

Statistical Multiplexing

Figure 4:
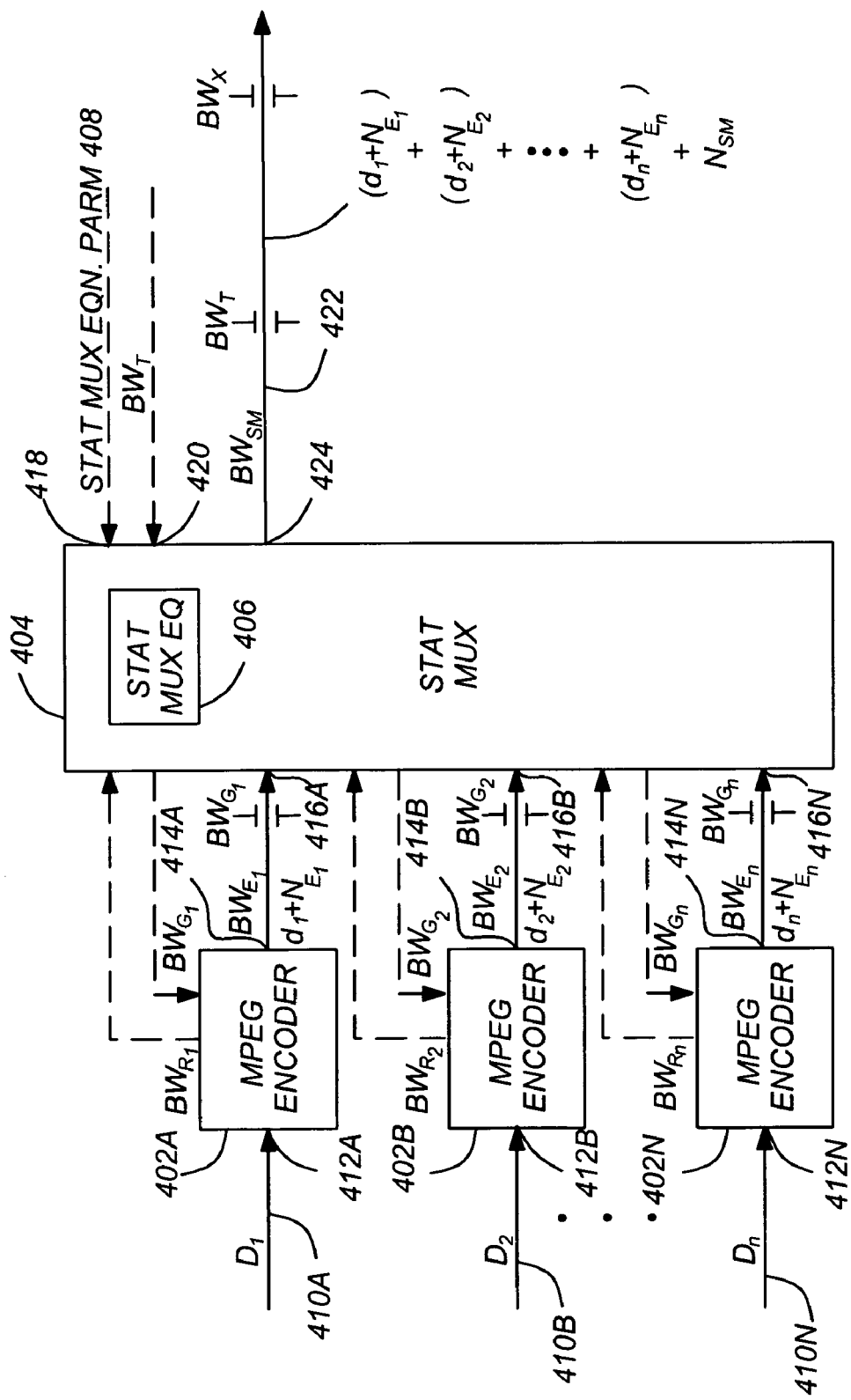
FIG. 4 is a diagram of how input data streams are combined by a statistical multiplexer before encoding, modulation and transmission.

FIG. 4 is a diagram presenting further detail of how the input data streams having video, audio, or data information are combined before encoding, modulation and transmission to the satellite 108. In FIG. 4, uncompressed data streams $D_1$-$D_n$ (labeled 410A-412N) are provided to the input 412A-412B) to encoders 402A-402N, respectively. In one embodiment, the encoders 402A-402N are MPEG encoders which compress the input data streams $D_1$-$D_n$ according to one or more of the standards (MPEG-1 or MPEG-2). Other compression techniques can be used as well.

The output 414A-414N of the encoders 402A-402N is each provided to a data input 416A-416N of a statistical multiplexer 404. The statistical multiplexer 404 manages the presentation of the encoder outputs at the output of the statistical multiplexer 404. As described below, this is accomplished by supervising the encoding of the data signals $D_1$, $D_2$, . . . , $D_n$ into compressed data signals $d_1$, $d_2$, . . . , $d_n$, accepting the compressed data signals $d_1$, $d_2$, . . . , $d_n$ from the encoders 402A-402N, and multiplexing the compressed data signals $d_1$, $d_2$, . . . , $d_n$ to provide an output signal 422 at an output 424 This output signal 424 is then encoded, modulated, and uplinked to the satellite 108.

Each of the encoders 402A-402N compresses the input data $D_1$-$D_N$ according to a maximum data rate that is negotiated with the statistical multiplexer 404. For example, the first encoder 402A examines the incoming data stream $D_1$ to determine how much the data stream can be compressed without compromising the excessive data loss. For example, if encoder 402A is tasked with compressing the incoming data stream $D_1$ according to an MPEG-2 encoding scheme, the encoder 402A examines data characteristics of the incoming data stream $D_1$ such as the scene complexity and temporal variation to estimate the maximum data rate that will be required in the compressed data signal $d_1$ to reproduce the input data stream according to pre-established standards. The encoder 402A then transmits this information, a "bandwidth" request $BW_{R_1}$, to the statistical multiplexer 404 (hereinafter, the term "bandwidth" will be used interchangeably with the phrases "data rate" or "throughput" and refers to the rate at which data may be transmitted over the particular data transmission channel). The statistical multiplexer 404 balances this bandwidth request with similar requests from the other encoders (402B-402N) according to a statistical multiplexer equation 406 having parameters 408 that can be input to the statistical multiplexer 404 at a first control input 418. Applying the statistical multiplexer equation 406, the statistical multiplexer 404 generates an optimal allocation of bandwidth among the encoders 402A-402N in order to meet a target bandwidth $B_T$ (which may be specified at a second control input 420) for the multiplexed signal output signal 422 at the output 424 of the statistical multiplexer 404. Because the transmission bandwidth $BW_X$ is ordinarily a fixed value determined by the uplink facility 104, the satellite 108 and the receiver station 132, the target bandwidth level $B_T$ is typically predetermined and remains constant, and may be less than or equal to the transmission bandwidth $BW_X$.

A bandwidth value ($BW_{G_1}$) is granted to the first encoder 402A, and thereafter, the first encoder 402A compresses the incoming data stream $D_1$ to assure that the data stream presented at the encoder 402A output, does not exceed the granted data rate or bandwidth value $BW_{G_1}$.

In the discussion which follows, the following definitions apply:

Null Data: "Null data" refers generically to data that includes no information, and includes all of the data types described below.

Null packet: A null packet is a packet that has an identifier indicating that the packet includes only null data. In the illustrated example, null packets include those with a packet identifier (PID) of 8191.

Zero video data: Padding in an elementary data stream that includes no useful data. Zero video data can be located before every program element such as the program start code, slice code, or sequence header.

Zero video packet: An entire transport packet that contains nothing but zero video data. Zero video packets are different from NULL packets in that NULL packets are clearly identified by a packet identifier.

In practice, the bandwidth requested by the encoder 402A $BW_{R_1}$ and subsequently granted by the statistical multiplexer 404 $BW_{G_1}$ is often greater than what is required to reproduce the input data stream $D_1$ within acceptable standards. In such cases, the encoder 402A typically inserts null data (such as zero video data) so that the data rate of the data stream $d_1$ output from the encoder 402A is a value consistent with the bandwidth $BW_{G_1}$ granted by the statistical multiplexer 404.

The need to insert zero video data can arise in several situations. One such situation occurs, when the estimate of the bandwidth required by the encoder 402A is in error (i.e. due to scene changes and other signal changes that are difficult or impossible to predict).

Another situation in which zero video data is inserted arises because the value of the granted bandwidth $BW_{G_1}$ and/or the requested bandwidth $BW_{R_1}$ is not continuously variable, but rather selected from a finite number of available values. For example, if the granted bandwidth $BW_{G_1}$ is a value of ten mega bits per second (10 MBPS), and the encoder can only compress the data to produce a 9 MBPS data stream or an 11 MBPS data stream, the encoder 402A will encode the data to not exceed the 9 MBPS rate, and insert null data for the remaining data.

The need to insert zero video data can also arise as follows. As a part of the set up of the encoders 402A-402N and the statistical multiplexer 404, a minimum rate can be imposed per video channel. Under such circumstances, a limit is set such that for any given sequence of images, a minimum bandwidth will be allocated. At times, the sequence of images can be encoded highly efficiently, using less than the minimum bandwidth imposed per channel. To meet the bandwidth agreed upon between the encoder 402 and the statistical multiplexer 404, the encoder pads the elementary stream with zeroes at the end of each picture element. This typically occurs with low complexity still or limited-motion images, such as slides or images of "talking heads."

Hence, the signal output from the encoder 402A can be represented as $d_1 + N_{E_1}$ wherein $d_1$ represents the compressed version of the input data stream $D_1$ (which would require an actual bandwidth $BW_{A_1} \leq BW_{G_1}$), and $N_{E_1}$ represents the zero video data added to the compressed input data stream so that the output of the encoder 402A is provided at the granted data rate $BW_{G_1}$. The bandwidth used to transmit the zero video data $N_{E_1}$ is referred to as encoder overhead bandwidth $BW_{OE_1}$. Hence, $BW_{A_1} + BW_{OE_1} = BW_{G_1}$.

Also, in practice, although the statistical multiplexer 404 specifies the bandwidth or data rate for the output signals from the encoders 402A-402N (as $BW_{G_1}, BW_{G_2}, \ldots, BW_{G_1}$) to meet the target bandwidth $BW_T$, the target bandwidth $BW_T$ is typically underspecified (not set to the maximum transmission bandwidth $BW_X$) to provide overhead $BW_{OSM}$ to provide for unexpected changes such as changes in transmission bandwidth $BW_X$. The output data stream provided by the statistical multiplexer 404 also typically includes null packets (e.g. null packets 310) so that the actual data rate of the output signal $BW_{SM}$ is less than the target data rate $BW_T$. Hence, the output of the statistical multiplexer includes a signal having compressed input data and null data according to the following relation:

$$(d_1 + N_{E_1}) + (d_2 + N_{E_2}) + \ldots + (d_n + N_{E_n}) + N_{SM}$$

wherein $N_{SM}$ represents the null packets added by the statistical multiplexer 404.

Figure 5:
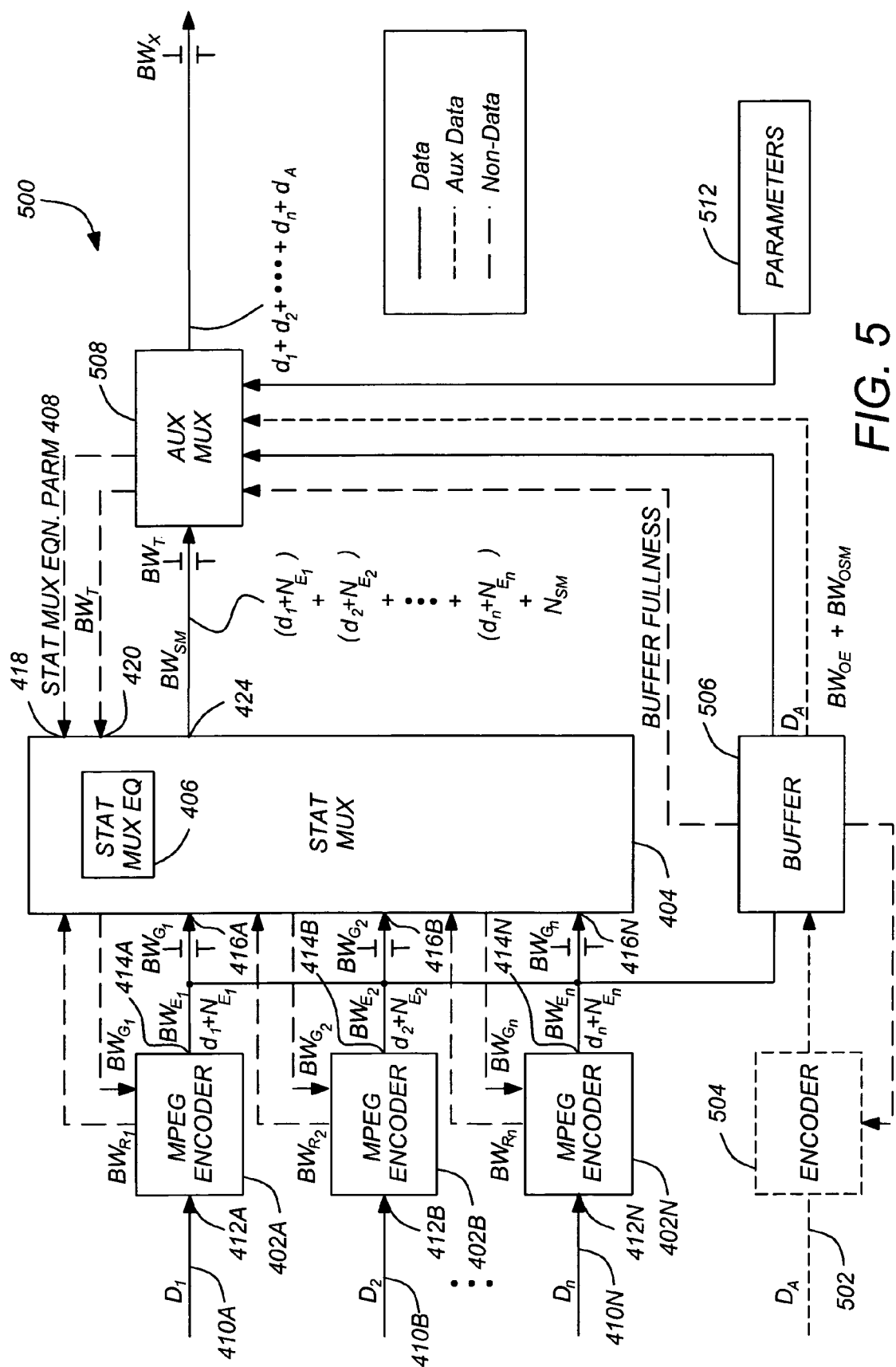
FIG. 5 is a diagram depicting one embodiment of a null packet replacer.

FIG. 5 is a diagram depicting one embodiment of a null packet replacer 500. The illustrated embodiment allows the substitution of auxiliary data $D_A$ 502 for the null data $N_{E_1} + N_{E_2} + \ldots + N_{E_n} + N_{SM}$ (which typically represents between one to five percent of the available bandwidth $BW_X$). It also allows control of the processes taking place in the statistical multiplexer 404 to permit the substitution of non-opportunistic auxiliary data 502, if desired.

Auxiliary data $D_A$ is provided to an auxiliary multiplexer 508 where the null data $D_A$ is inserted in the place of null data packets in the output stream $N_{E_1} + N_{E_2} + \ldots + N_{E_n} + N_{SM}$ provided at the output 424 of the statistical multiplexer 404. In one embodiment of the invention, the auxiliary data $D_A$ is stored in a buffer 506 communicatively coupled between the auxiliary data input data stream 502 and the auxiliary multiplexer 508 before being provided to the auxiliary multiplexer 508. Storage of auxiliary data $D_A$ in the buffer 506 permits the auxiliary data $D_A$ to be delayed for a short period of time before substitution for null data in the data stream output from the statistical multiplexer. The incoming data can be optionally compressed and/or encoded by an encoder 504 before temporary storage in the buffer 506 (or, if a buffer 506 is not provided, the auxiliary data $D_A$ can be transmitted directly from the encoder 504 to the auxiliary multiplexer 508).

If auxiliary data $D_A$ is presented to the buffer 506 at a rate exceeding that which the data can be inserted into the output data stream, the amount of data stored in the buffer 506 will approach the memory capacity of the buffer, thus decreasing the amount of unused memory in the buffer 506 and increasing the "fullness" of the buffer 506 increases. In one embodiment, this information is provided from the buffer 506 to the auxiliary multiplexer 508. The auxiliary multiplexer 508 uses this information to command the statistical multiplexer 404 to control the process used in multiplexing the data streams from encoders 402A-402N, thereby reducing (or increasing) the bandwidth or data rate requirements for the data presented at the output of the statistical multiplexer 404. For example, if buffer 506 is used to store non-opportunistic data (which must be transmitted at a minimum service level) and the "buffer fullness" signal indicates that the buffer is approaching it's capacity to store data, the auxiliary multiplexer 508 can command the statistical multiplexer 404 to combine the signals from each of the encoders 402A-402 in a way that reduces the data rate of the data $d_1 + d_2 + \ldots + d_n$ presented at the output of the statistical multiplexer 404, as described further below. This increases the proportion of null data packets having null data $N_{E_1} + N_{E_2} + \ldots + N_{E_n} + N_{SM}$ in the data presented at the output of the statistical multiplexer 404, thus permitting the substitution of more auxiliary data $D_A$ in the output signal, and allowing the "fullness" of the buffer 506 to decrease. Similarly, the auxiliary multiplexer 508 may command the statistical multiplexer 404 to combine the signals from the encoders 402A-402N in such a way that increases the data rate of the data $d_1 + d_2 + \ldots + d_n$ presented at the output of the statistical multiplexer 404 when the buffer 506 is below a desired value. Hence, the "fullness" of the buffer 506 can be used adaptively to assure that the output data stream from the auxiliary multiplexer has virtually no null data packets. In one embodiment, the buffer 506 can also accept some or all of the data from the encoders 402A-402N, and provide the data to the auxiliary multiplexer 508.

The auxiliary multiplexer 508 can control the statistical multiplexer in many ways to permit the introduction of auxiliary data $D_A$. In one embodiment, the auxiliary multiplexer 508 provides a command to alter or add to the statistical multiplexer equation 406 (or to change the statistical multiplexer equation 406 itself), essentially making adding a "proxy" for the new data in the statistical multiplexer 404 so that it may negotiate for the auxiliary data $D_A$ like any other of the data sources. This technique can provide increased null packets for inserting auxiliary data $D_A$ on a rapid basis (in the order of a frame or so).

Alternatively or in addition to manipulation of the statistical multiplexer equation 406, the auxiliary multiplexer 508 may also command the statistical multiplexer 404 to combine the data from encoders 402A-402N to meet a different (reduced or increased) target bandwidth requirement $BW_T$.

In one embodiment of the auxiliary multiplexer 508 substitutes auxiliary data $D_A$ for null data $N_{E_1} + N_{E_2} + \ldots + N_{E_n} + N_{SM}$ according to a process defined at least in part according to null packet replacement parameters 512. The null packet replacement parameters include, for example:

$BW_{MIN}$—The minimum rate required to keep the data service active;

$BW_{MAX}$—The maximum sustained data rate of the data service;

$BW_{AVG}$—The nominal or guaranteed rate over a time period $t_{per}$;

$t_{per}$—The time period used to determine the average rate $BW_{AVG}$. The value of $t_{per}$ can be used to infer that the data stream can be delayed by a nominal and maximum amount of time; and Priority—A priority of the data service compared to the other services. The Priority may be expressed as a rank.

The each source of auxiliary data $D_A$ is assigned one or more of the foregoing parameters (the data streams entering the encoders 402A-402 may also be assigned one or more of these parameters). Along with the "buffer fullness" measure provided by the buffer 506, the foregoing values are used by the auxiliary multiplexer 508 to determine when there is sufficient null data $N_{E_1}+N_{E_2}+ \ldots +N_{E_n}+N_{SM}$ to allow substitution of the auxiliary data $D_N$. If there is insufficient null data in the output stream from the statistical multiplexer 404 to provide the auxiliary data at the minimum rate required to keep the data service active $BW_{MIN}$, the auxiliary multiplexer can command the statistical multiplexer 404 to provide additional null packets (via manipulation of the statistical multiplexer equation 406 or target bandwidth $BW_T$).

For example, in satellite television applications, a master program guide (MPG) which provides information regarding the timing and content of video programs is transmitted. This information was typically transmitted as one of the data streams $D_1$-$D_n$ and regarded as a constant bit rate (CBR) data stream in the order of 100 Kb/s. In order to prevent data overloads, a driver may be inserted between the source of MPG data and statistical multiplexer 404 to carefully maintain an average data rate for the MPG data stream of about 80% of the CBR rate, while temporarily storing excess data in a buffer. In this example, the MPG data can be assigned values of: $BW_{MIN}$=50 Kb/s; $BW_{MAX}$=500 Kb/s (burst=4 packets, 5 packets must not exceed $BW_{MAX}$, $BW_{AVG}$=80 Kb/s, $t_{per}$=2 seconds; and Priority=rank 1.

By storing the MPG data in a buffer such as buffer 506, the average delay before the MPG data is provided at the output of the auxiliary multiplexer 508 is approximately 1 second and the maximum delay could be just under 2 seconds while still satisfying the requirement to meet the average rate of 80 Kb/s. By exercising the limits of the buffer 506, the MPG data can be inserted into the data stream output from the statistical multiplexer 404 even though the instantaneous null data rate is not known in advance. However, the instantaneous null data rate must be higher than the average data rate of the auxiliary data stream(s).

In situations where sufficient null data can be freed up by manipulating the statistical multiplexer equation 406 or the target bandwidth $BW_T$ of the statistical multiplexer 404, the auxiliary multiplexer 404 can analyze the auxiliary data $D_A$ according to the parameters described above, and drop non essential data or transfer it to long term storage at a more temporally distant time.

For example, the MPG data stream described above is typically organized as a carousel of data that is repeated every few seconds. If the transmission of the data in the carousel normally took 4 seconds, one wrap of the carousel could be dropped if there are insufficient null packets output from the statistical multiplexer 404. Further, the data requirements for the MPG could be reduced by 50% of the average rate by dropping every other transmission of the carousel data. By assigning a priority value for all of the auxiliary data services (or, for that matter, all of the data services, including data streams $D_1$-$D_n$, it is possible to temporarily lose non-essential descriptive information while protecting critical data.

Figure 6A:
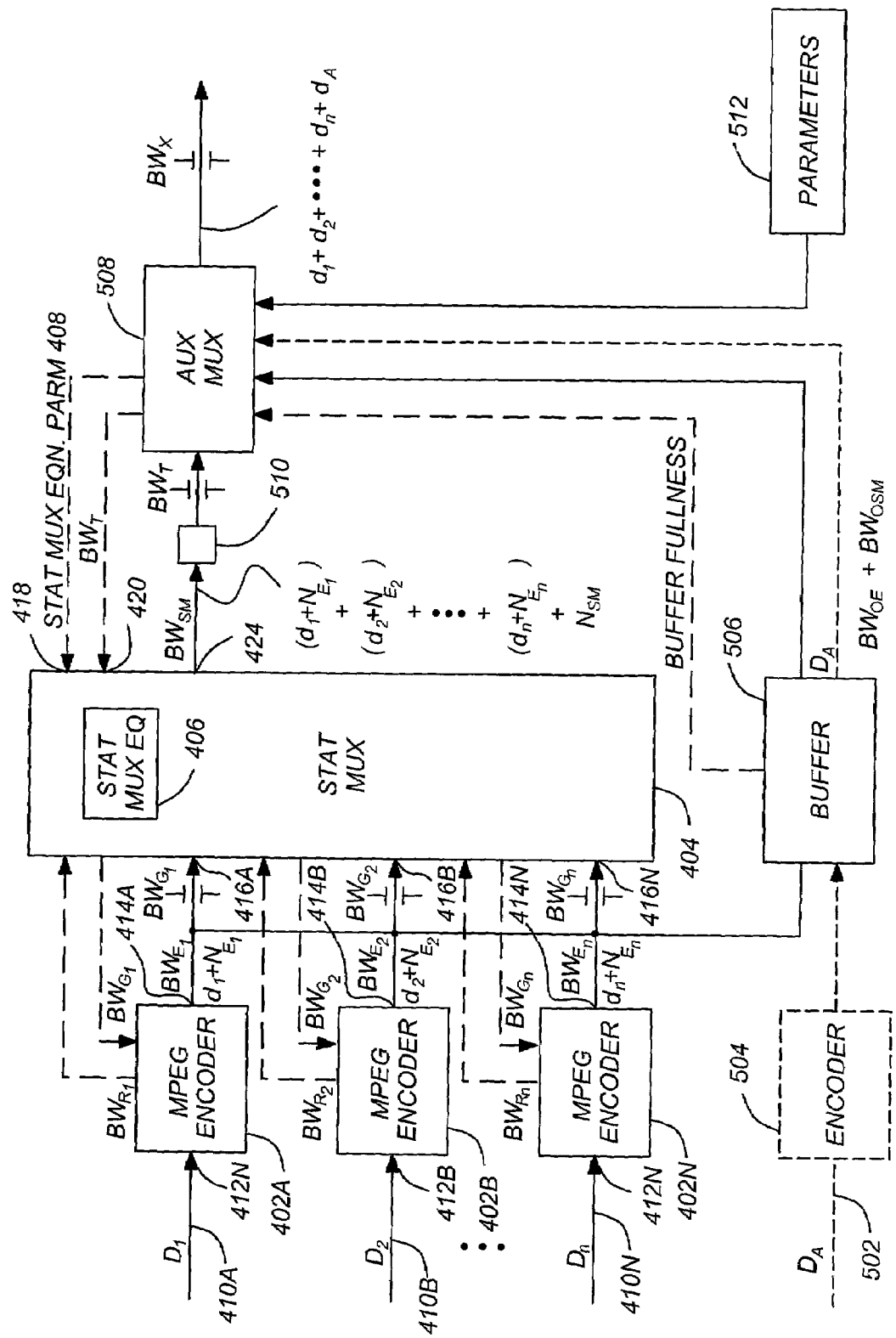
FIGS. 6A and 6B are diagrams depicting further embodiments of the null packet replacer.
Figure 6B:
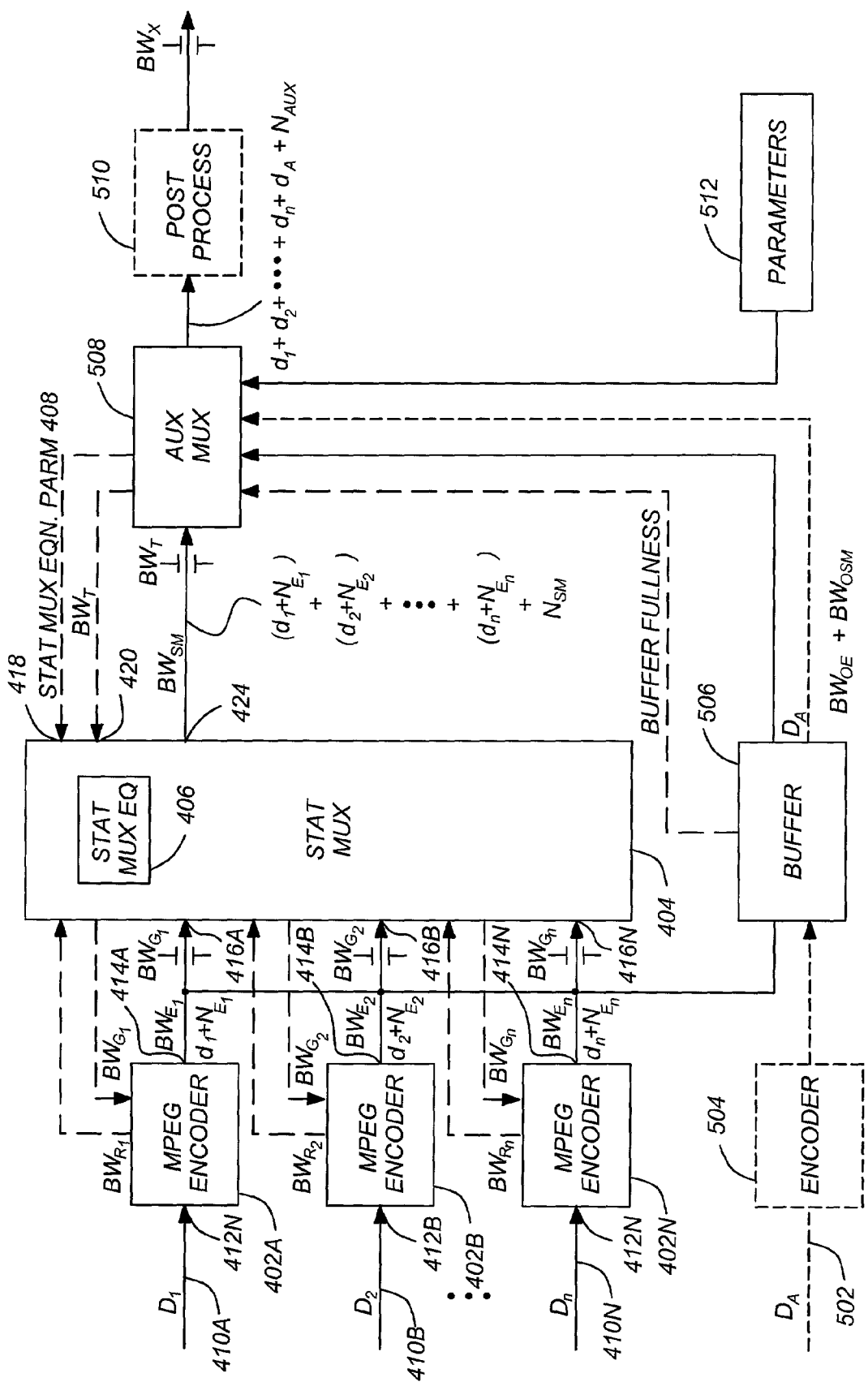

FIGS. 6A and 6B illustrates a post processor 510 that, in conjunction with any of the foregoing elements, can be used to insert auxiliary data $D_A$ before transmission, while still remaining below the maximum transmission data rate $BW_X$. The post processor 510 can be communicatively coupled to the output of the auxiliary multiplexer 508 as shown in FIG. 6A or communicatively coupled between the statistical multiplexer 404 and the auxiliary multiplexer 508 as shown in FIG. 6B.

Turning first to the embodiment disclosed in FIG. 6A, post processing is performed on the data stream $(d_1+N_{E_1})+(d_2+N_{E_2})+ \ldots +(d_n+N_{E_n})+N_{SM}$ from the output of the statistical multiplexer 418 to further compress the data streams $d_1$-$d_n$. This would ordinarily be performed when the amount of null data $N_{E_1}+N_{E_2}+ \ldots +N_{E_n}+N_{SM}$ is insufficient to meet the minimum throughput $BW_{MIN}$ required by the auxiliary data $D_A$. This can be accomplished by decoding the encoded data streams $d_1$-$d_n$, to reconstruct the original data streams to produce $D_1'$-$D_n'$ (since the encoding performed by encoders 402A-402N is lossy encoding, the reconstructed signal is not identical to the signals $D_1$-$D_n$ provided to the encoders 402A-402N,), then recoding the decoded data streams so that the recoded data streams $d_1'$-$d_n'$ are more compressed than the original encoded data streams $d_1$-$d_n$, thus freeing up bandwidth to permit the addition of auxiliary data $D_A$. If desired, the degree of further compression can be controlled either by the auxiliary multiplexer 508, or directly by a signal from the buffer 506 regarding buffer fullness. In one embodiment, the encoders 402A-402N are MPEG encoders, and the process of decoding the encoded data streams $d_1$-$d_n$ and recoding them may take into account the activity and general picture quality via the m-quant value inherent in such encoding/decoding schemes. In this embodiment, examination of this m-quant value can permit a determination as to whether further compression is permissible, and the extent of such further compression can be made.

In the embodiment disclosed in FIG. 6B, post processing is performed on the data signal emanating from the output of the auxiliary multiplexer 508. The signal emanating from the output of the auxiliary multiplexer 508 $d_1+d_2+ \ldots +d_n+d_A$ can have a throughput that exceeds $BW_x$ because the further compression provided by the post processor 510 reduces the throughput requirement back to a value that is equal to or less than $BW_x$.

Figure 7:
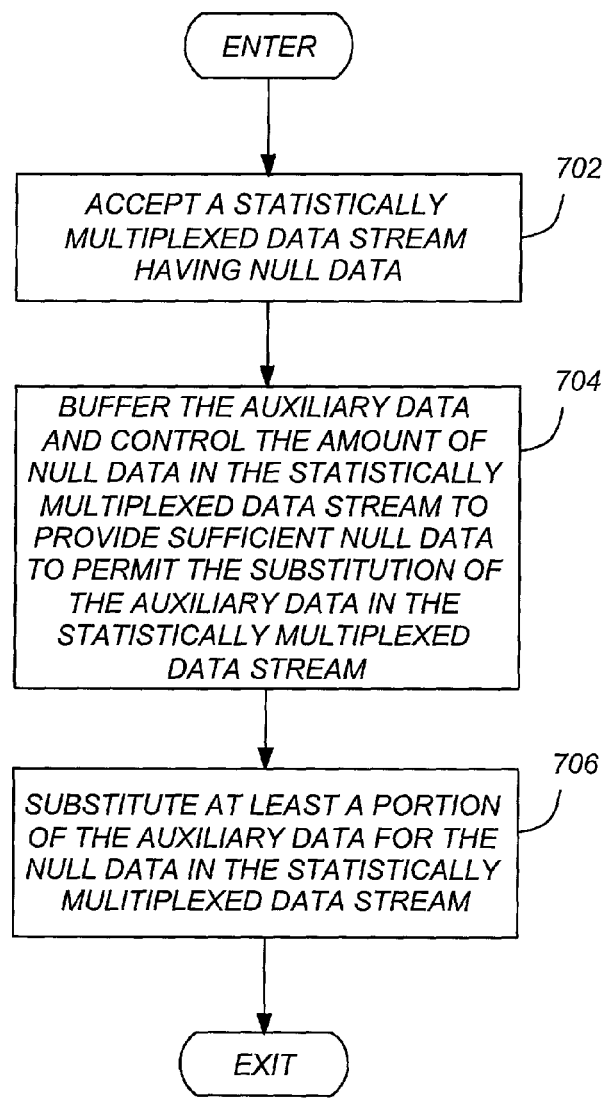
FIG. 7 is a flow chart presenting illustrative method steps that can be used to practice one embodiment of the present invention.

FIG. 7 is a diagram depicting exemplary method steps that can be used to practice the present invention. A statistically multiplexed data stream having null data is accepted, as shown in block 702. Auxiliary data $D_A$ is buffered and the amount of null data in the statistically multiplexed data stream is controlled to provide sufficient null data to permit the substitution of the auxiliary data $D_A$ in the statistically multiplexed data stream. This is shown in block 704. At least a portion of the auxiliary data $D_A$ is substituted for the null data in the statistically multiplexed data stream.

Identification and Replacement of Null and Zero Packets

Figure 8:
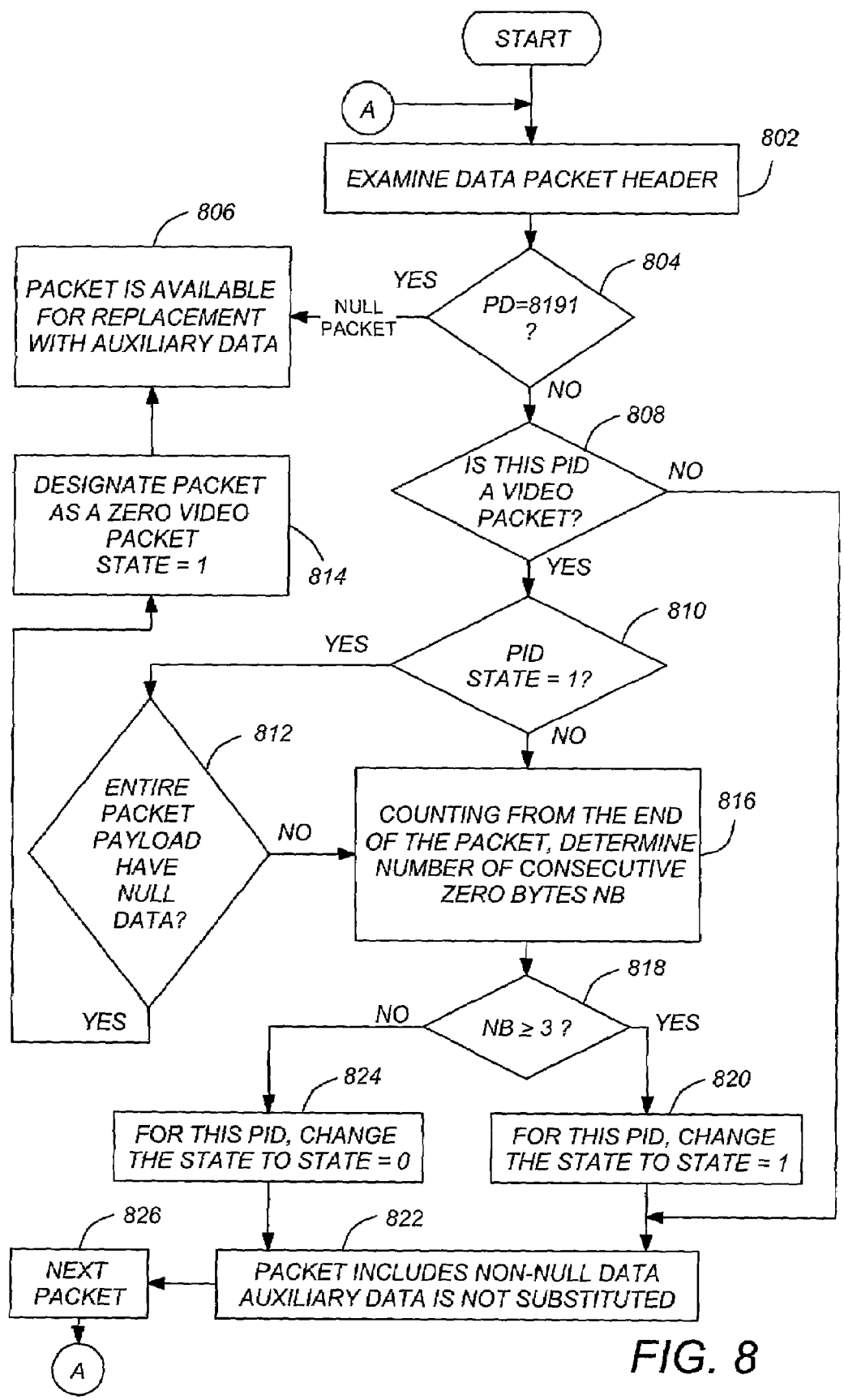
FIG. 8 is a flow chart presenting illustrative method steps which can be used to identify null and zero data packets for replacement with auxiliary data packets.

FIG. 8 is a flow chart presenting illustrative method steps which can be used to identify null and zero data packets for replacement with auxiliary data packets. As described above, the auxiliary multiplexer 508 looks at the identifies data packets having null data $N_{E_1}+N_{E_2}+ \ldots +N_{E_n}$ and zero data $N_{SM}$. This can be performed by examining the output of the statistical multiplexer 404, or the output of each of the encoders 412. As shown in blocks 802 and 804, packets having zero data $N_{SM}$ can be identified by examination of the first packet segment 320 or header for an identifier indicating that the data packet includes only null data. For example, if the PID 912 in the header matches the value assigned to a null packet (PID=8191, for example), the packet is determined to be a null packet, and auxiliary data can be substituted for the payload of that data packet, as shown in block 806. If the PID 912 does not match the value assigned to a null packet, the packet is further examined.

Figure 9:
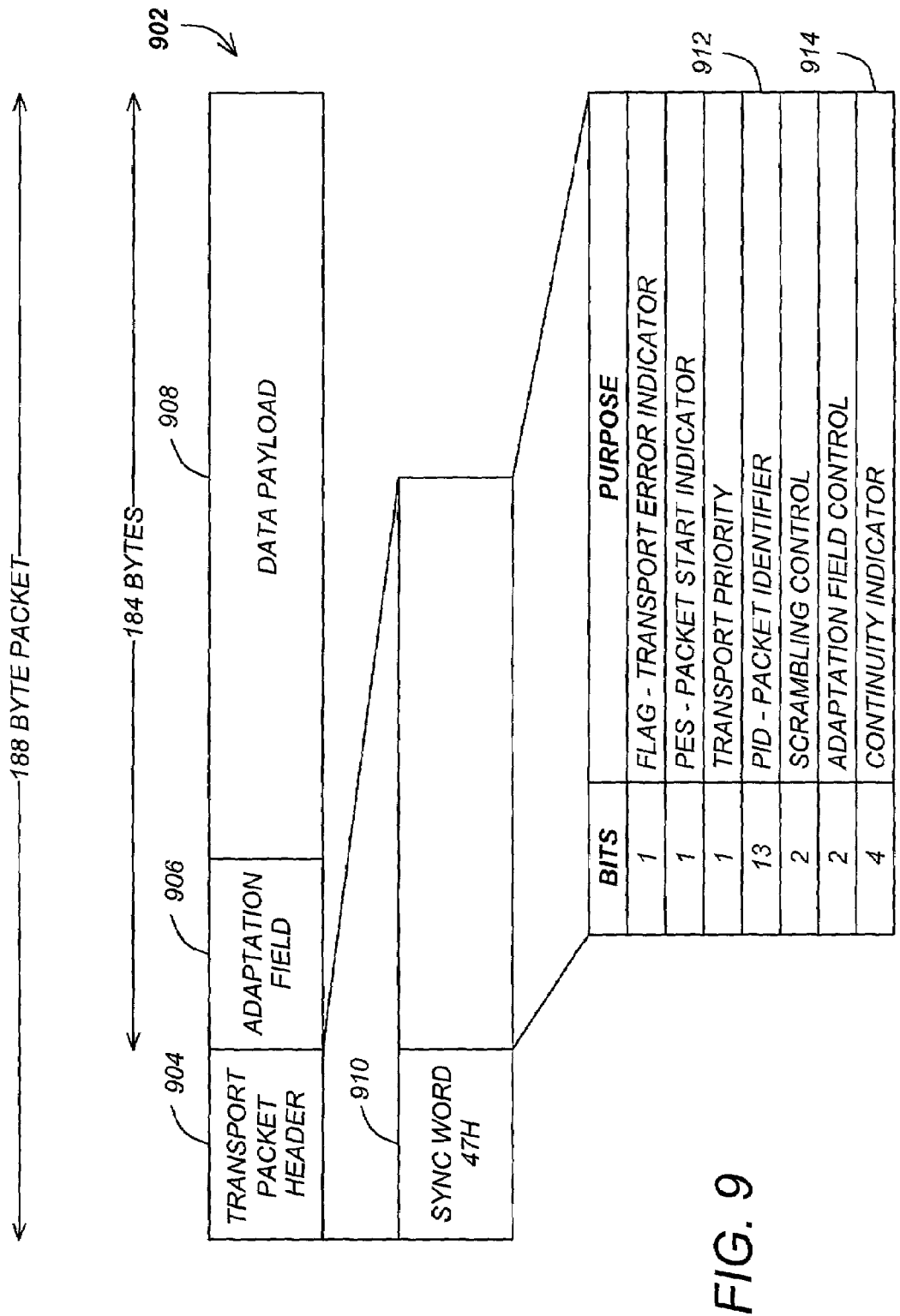
FIG. 9 is a diagram presenting a depiction of an exemplary transport packet from an encoder.

FIG. 9 is a diagram presenting a depiction of an exemplary transport packet 902 according to the MPEG-2 standard. The transport packet includes a header 904, an optional adaptation field 906 and a data payload section 908. The transport header 904 includes a synchronization word 910 and a plurality of bit assignments including those which are assigned to the PID 912 to identify the packet and a continuity indicator 914.

Zero packets (packets with null data inserted by encoders 412 in the data payload section 908) are more difficult to detect, because the header (904 and/or 320) of the zero data packet may be identical to the header of a data packet with video or audio data. Zero packets can be identified by fully parsing the MPEG data stream and identifying unnecessary zero bytes for elimination. However, this technique is computationally intensive. In one embodiment of the present invention, the data packets are screened to identify those which might be candidates for having sufficient null data to permit substitution of auxiliary data. This can be accomplished with the nextbits( ) function, (defined in ITU-T H.262, in paragraphs 6.2.4 and 5.2.2, which references are hereby incorporated by reference) which permits comparison of a bit string with the next bits to be decoded in the bitstream).

Some encoding schemes used by the encoders 402 chop data asynchronously across data packets. All current MPEG encoders, for example, chop data asynchronously into transport packets. Thus, a particular data value or set of related data values may be transmitted by more than one data packet (although both will have the same PID). Consequently, to be sure that the current packet under examination (which may have all zeros, but has not been assigned a PID indicating it has nothing but null data) is a packet that is transmitting a data value consisting of only null data, it is necessary to examine the temporally adjacent (e.g. previous) packet having the same PID. If examination of the previous packet reveals that both packets transmit only null data, then the packet is a candidate for the substitution of auxiliary data. If examination of the previous packet reveals that the current packet includes only null data but the previous packet included non-null data, then the current packet is not a candidate for substitution of auxiliary data. The logic for performing this packet examination is shown in FIG. 8.

The logic shown in FIG. 8 assume that two data elements are available for each packet (and PID) under examination. The first is a flag (STATE) for each packet (according to the packet PID). The initial value for the STATE flag is zero. The second element of information is a static table that defines which packets (according to the packet's PID) are video and hence likely to include null data. This data can be obtained from an MPEG PMT or from a configuration table that is external to the data stream under examination.

Returning specifically now to FIG. 8, block 808 determines whether the packet under consideration is a packet of a type that is likely to have null data, such as a video packet (although in other embodiments, null data may be included in audio or other data). This determination can be made, for example, by examining the PID of the packet and comparing the PID to a look up table. If the packet is of a type that is not likely to have null data, the data packet under examination is not a candidate for substitution, and auxiliary data is not substituted into the packet, as shown in block 822. The next packet is be examined, as shown in block 826.

Block 810 tests a STATE flag that is associated with the PID for the packets. The STATE flag describes the following state conditions:

STATE=0: This is the default state, and indicates that a prior data packet with the same PID appearing in the data stream 424 included non-null data and ended in a manner that would indicate that this packet cannot be a zero video packet. If the STATE flag=0, the END of the current packet (the packet under examination) is examined, beginning at the last payload byte and moving forward, to determine if there are a sufficient number NB of consecutive zero bytes. This is depicted in block 816.

In one embodiment NB≧3 represents the smallest value when it is known that the start codes following stuffing are packet aligned (typically true). NB≧5 is the smallest value when it is not known that the start codes following stuffing are not packet aligned.

If there are a sufficient number of zero bytes it is determined that the current packet may include null data, and the STATE is changed to STATE=1. The final determination as to whether the current packet includes zero data or not is deferred until examination of the next data packet with the same PID.

STATE=1: When STATE=1, the previously examined packet (with the same PID) ended with three consecutive zero bytes, indicating that the current packet under examination is at the end of a slice. A test is then made to determine if the entire data payload of this packet is zero bytes, as shown in block 812. If so, then the packet is a zero video packet and is a candidate to have it's zero or null data replaced with auxiliary data, as shown in blocks 814 and 806. In this case, the STATE remains as 1, since the last three bytes of the packet are all zeros. If the entire data payload is not all zero bytes, then this packet has non-null data in the payload (it is not a zero video packet) and processing is passed to block 816. In block 816, the current packet is checked from the last payload byte, going forward, to determine if the last three bytes in the packet are zero bytes. If so, then the STATE for this PID is set to STATE=1 (which, as described above, is used to determine whether to substitute null data in the next packet that is examined). If there are not three consecutive non-zero bytes counting from the end of the packet, the STATE kept at zero and the current packet is not a candidate for substitution of auxiliary data, since it contains non-null data.

Therefore, to determine whether auxiliary data can be substituted for zero data, two data packets are examined: (1) the current data packet, and (2) a data packet having the same PID and temporally adjacent to the current data packet. If data packet (2) includes at least a number NB consecutive zero data values and data packet (1) includes all zero data values, data packet (1) is a candidate to have at least a portion of the auxiliary data $D_A$ substituted for the data payload.

Although the foregoing describes a method in which auxiliary data is not substituted for the data in a packet unless the entire packet comprises null data and the previous packet had at least three consecutive bytes of zero data at the end of the packet, the different substitution schemes may be implemented as appropriate for the coding methods employed by the encoders 402 and the statistical multiplexer 404. For example, the method may be modified so that non-zero null data padding may be recognized as well, or so that NB equals a different integer. Further, in one embodiment of the present invention, auxiliary multiplexer 508 examines the incoming data stream, determines what sort of protocol was used to pad each data stream with null data and/or to multiplex different data streams together, and adaptively modifies the algorithm used to substitute auxiliary data for the null data according to the determined protocol. In this embodiment, the auxiliary multiplexer 404 may substitute auxiliary data for null data inserted by encoders 402 using different padding protocols and schemes (e.g. a system in which encoder 402A is an MPEG-2 compliant encoder, but encoder 402B is an encoder complying to an entirely different encoding standard).

The substitution of data for null data in zero data packets or null data packets may require regeneration of the continuity indicators 914 in the header 914 of the transport packets 902 of the data stream to maintain the correct syntax of the transport data packet.

In a further embodiment, the auxiliary multiplexer 504 also provides additional functionality to make packet-by-packet decisions regarding when insertion of auxiliary data for null data is permitted. For example, the auxiliary multiplexer 504 may impose a maximum data rate at which data from the buffer 506 can be placed in the output data stream via the use of a governor that imposes a minimum packet spacing for each stream. If the minimum number of packets have not passed since the last data packet was applied, the governor restricts the data from being read out of the buffer 506 and provided at the output of the auxiliary multiplexer 508. A packet-by-packet priority system can be employed to select which of the plurality of data packets available at the buffer 506 are to be restricted by the governor and/or to be read and provided at the output before other data packets.

The priorities assigned to particular data streams may also be dynamic in that they may change over time to assign higher priorities to auxiliary data streams when required. For example, a priority counter may be incremented each time an auxiliary datastream/packet is passed by for data insertion, moving the data stream/packet up in relative priority compared to other datastreams/packets. The datastream/packet with the highest current priority is then designated to replace the next available null/zero data packet.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing disclosure presents an embodiment of the present invention as it is applied to a satellite transmission system, the present invention can be used to transmit data using any wireless or cable transmission system. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended

What is claimed is:

1. An apparatus for adding auxiliary data $D_A$ to an output data stream, comprising:
   a statistical multiplexer having a plurality of inputs including a first input, and an output providing the output data stream;
   a first encoder, having an output communicatively coupled to the a first statistical multiplexer input, the first encoder for compressing a first data stream $D_1$ according to a first actual data rate $BW_{A_1}$ that is less than or equal to a first granted data rate $BW_{G_1}$ granted by the statistical multiplexer in response to a requested data rate $BW_{R_1}$ from the encoder, the difference between the first actual data rate $BW_{A_1}$ and the first granted data rate $BW_{G_1}$ defining an encoder overhead rate $BW_{OE1}$ such that $BW_{G_1} - BW_{A_1} = BW_{OE_1} \geq 0$, the first encoder having an output including a compressed version of the first data stream $d_1$ provided at the actual data rate $BW_{A_1}$ and encoder null data $N_{E_1}$ at the overhead rate $BW_{OE1}$; and
   an auxiliary multiplexer, communicatively coupled to the statistical multiplexer, for sensing encoder null data $N_E$ and for substituting at least a portion of the auxiliary data $D_A$ for the encoder null data $N_H$.

2. The apparatus of clam 1, wherein the auxiliary multiplexer is communicatively coupled to the output of the statistical multiplexer.

3. The apparatus of claim 2, further comprising a buffer, communicatively coupled to the auxiliary multiplexer, the buffer for buffering the auxiliary data.

4. The apparatus of claim 3, wherein the auxiliary multiplexer substitutes the auxiliary data according to an unused memory of the buffer.

5. The apparatus of claim 2, wherein the auxiliary multiplexer further senses statistical multiplexer null data $N_{SM}$ and substitutes at least a portion of the auxiliary data for the multiplexer null data $N_{SM}$.

6. The apparatus of claim 2, wherein:
   the statistical multiplexer manages the the first encoder output according to a first command input describing a target data rare of the output data stream $B_T$; and
   the auxiliary multiplexer is communicatively coupled to the statistical multiplexer first input to command a change the target data rate of the output data stream $B_T$.

7. The apparatus of claim 6, further comprising a buffer, communicatively coupled to the auxiliary multiplexer, the buffer for buffering the auxiliary data, wherein the auxiliary multiplexer changes the target data rare according to an unused memory of the buffer.

8. The apparatus of claim 6, wherein the auxiliary multiplexer changes the target data rate according to one or more auxiliary data parameters selected from the group comprising:
   a minimum auxiliary data rate $BW_{MIN}$;
   a maximum auxiliary data rare $BW_{MAX}$;
   a nominal auxiliary data rate $BW_{AVG}$ measured over a time period $t_{per}$; and
   a priority.

9. The apparatus of claim 6, wherein the change in the target data rate of the output data is commanded to decrease the target rate of the output data stream $B_T$ to permit the substitution of auxiliary data $D_A$ for the multiplexer null data $N_{SM}$.

10. The apparatus of claim 6, wherein:
    the auxiliary multiplexer further senses statistical multiplexer null data $N_{SM}$ and substitutes at least a portion of the auxiliary data for the multiplexer null data $N_{SM}$; and the change in the target data rate of the output data is commanded to decrease the target rate of the output data stream $B_T$ to permit the substitution of auxiliary data $D_A$ for data selected from the group comprising the encoder null data $N_{E_1}$ and the multiplexer null data $N_{SM}$.

11. The apparatus of claim 10, wherein the auxiliary data is added at a pre-specified minimum auxiliary data rate.

12. The apparatus of claim 2, further comprising:
a second encoder, having an output communicatively coupled to the a first statistical multiplexer input, the second encoder for compressing a second data stream $D_2$ according to a second actual data rate $BW_{A2}$ that is less than or equal to a second granted data rate $BW_{G2}$ granted by the statistical multiplexer [in response to a requested data rate $BW_{R_1}$ from the second encoder, the difference between the second actual data rate $BW_{A2}$ and the first granted data rate $BW_{G_2}$ defining an encoder overhead rate $BW_{OE2}$ such that $BW_{G_1} - BW_{A_1} = BW_{OE2} \geq 0$, the second encoder having an output including an compressed version of the second data stream provided at the actual data rate $BW_{A2}$ and encoder null data $N_{E2}$ at the overhead rate $BW_{OE2}$, the second encoder having an output;
wherein the statistical multiplexer allocates data presented at the plurality of inputs to the statistical multiplexer output according to a statistical multiplexer second command input; and
wherein the auxiliary multiplexer is communicatively coupled to the statistical multiplexer second input to command a change in the allocation of the data presented at the plurality of inputs to the statistical multiplexer output.

13. The apparatus of claim 12, wherein the auxiliary multiplexer changes the allocation of the data presented at the plurality of inputs to the statistical multiplexer output according to an unused memory of a buffer communicatively coupled to the auxiliary multiplexer, the buffer for buffering the auxiliary data.

14. The apparatus of claim 13, wherein the multiplexer changes the allocation of the data presented at the plurality of inputs to the statistical multiplexer output according to an unused memory of the buffer.

15. The apparatus of claim 1, wherein the auxiliary multiplexer is communicatively coupled to the output of the encoder and the input of the statistical multiplexer to sense the encoder null data $N_E$.

16. A method of adding auxiliary data $D_A$ to a data stream, comprising the steps of:
accepting a statistically multiplexed data stream having null data;
substituting at least a portion of the auxiliary data $D_A$ for the null data in the statistically multiplexed data stream; and
prior to the substitution of the at least a portion of the auxiliary data $D_A$ for the null data in the statistically multiplexed data stream, controlling an amount of the null data in the statistically multiplexed data stream to provide sufficient null data to permit the substitution of at least some of the auxiliary data $D_A$ in the statistically multiplexed data stream.

17. The method of claim 16, wherein the auxiliary data $D_A$ is non-opportunistic data.

18. The method of claim 16, further comprising the step of:
buffering the auxiliary data $D_A$ until there is sufficient null data to permit the substitution of the at least some of the auxiliary data $D_A$ in the statistically multiplexed data stream.

19. The method of claim 18, wherein the amount of null data is controlled according to a relationship between an amount of the buffered auxiliary data $D_A$ and a capacity of a buffer scoring the buffered data.

20. The method of claim 16, wherein the null data comprises statistical multiplexer null data $N_{SM}$.

21. The method of claim 20, wherein the statistically multiplexed data stream is statistically multiplexed to a throughput less than or equal to a target throughput value $BW_T$, and the step of controlling an amount of null data in the statistically multiplexed data stream comprises the step of altering the target throughput value $BW_T$.

22. The method of claim 16, wherein the null data comprises encoder null data $N_E$.

23. The method of claim 22, wherein the statistically multiplexed data stream is statistically multiplexed according to a statistical multiplexer equation, and the step of controlling an amount of null data in the statistically multiplexed data stream comprises the step of altering the statistical multiplexer equation.

24. The method of claim 16, further comprising the step of:
examining the auxiliary data $D_A$ for non-essential data; and
eliminating the non-essential data from the auxiliary data $D_A$ before substituting the auxiliary data $D_A$ for the null data in the statistically multiplexed data stream.

25. The method of claim 16, wherein the amount of null data in the statistically multiplexed data stream is controlled according to a parameter set describing the auxiliary data $D_A$, including:
a minimum throughput required to keep the data service active $BW_{MIN}$;
a maximum sustained throughput of the data service $BW_{MAX}$; and
a nominal or guaranteed rate over a time period $BW_{AVG}$.

26. The method of claim 16, wherein the data stream comprises a set of data packets all having a packer ID including a first data packet and a second data packet temporally adjacent the first data packet, and the step of substituting at least a portion of the auxiliary data $D_A$ for the null data in the statistically multiplexed data stream comprises the steps of:
substituting at least a portion of the auxiliary data $D_A$ for the data in the second data packet if the first data packet includes at least a number NB consecutive zero data values and the second data packer includes all zero data values.

27. A system for transmitting auxiliary data $D_A$ packetized satellite signal, comprising:
a statistical multiplexer having a plurality of inputs including a first input, and an output providing an output data stream;
a first encoder, having an output communicatively coupled to the a first statistical multiplexer input, the first encoder for compressing a first data stream $D_1$ according to a first actual data race $BW_{A_1}$ that is less than or equal to a first granted data rate $BW_{G_1}$ granted by the statistical multiplexer in response to a requested data rate $BW_{R_1}$ from the encoder, the difference between the first actual data rate $BW_{A_1}$ and the first granted data rate $BW_{G_1}$ defining an encoder overhead rate $BW_{OE1}$ such that $BW_{G_1}-BW_{A_1}=BW_{OE_1} \geqq 0$, the first encoder having an output including a compressed version of the first data stream $d_1$ provided at the actual data rate $BW_{A_1}$ and encoder null data $N_{E_1}$ at the overhead rate $BW_{OE}$; and an auxiliary multiplexer, communicatively coupled to the statistical multiplexer, for sensing encoder null data NF and for substituting at least a portion of the auxiliary data $D_A$ for the encoder null data $N_B$;

a modulator communicatively coupled to the auxiliary multiplexer, for modulating the output data stream;

a transmitter, communicatively coupled to the modulator for transmitting the output data stream; and a transponder, for receiving the transmitted modulated output data stream and for retransmitting the received output data stream to a subscriber.

28. The system of claim 27, wherein the auxiliary multiplexer is communicatively coupled to the output of the encoder and the input of the statistical multiplexer to sense the encoder null data.

* * * * *